United States Patent Office 3,697,480
Patented Oct. 10, 1972

3,697,480
PROCESS FOR THE MANUFACTURE OF ESTER RESINS CONTAINING ISOCYANURATE GROUPS AND IMIDE GROUPS
Gerhard Schade, Witten-Bommern, and Franz Blaschke, Witten-Annen, Germany, assignors to Dynamit Nobel Aktiengesellschaft, Troisdorf, Germany
No Drawing. Filed May 14, 1970, Ser. No. 37,326
Claims priority, application Germany, May 16, 1969,
P 19 24 808.9
Int. Cl. C08g 17/06, 20/32
U.S. Cl. 260—47 CB                    10 Claims

ABSTRACT OF THE DISCLOSURE

Process of producing ester resins containing isocyanurate groups and imide groups in the polymer chain comprising condensing a polyalcohol with a tricarboxylic acid of the formula:

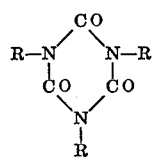

I wherein R represents a moiety having the formula:

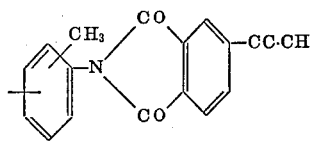

II characterized by the step of forming said tricarboxylic acid by contacting triphenolic urethane trimerized toluylene diisocyanate and trimellitic acid anhydride in a medium containing the polyalcohol, at a temperature and for a time sufficient for formation of said tricarboxylic acid.

---

The subject of the invention is a process for the manufacture of ester resins containing isocyanurate groups and imide groups, by reaction of polyalcohol and polycarboxylic acid wherein the polycarboxylic acid includes the acid having the formula:

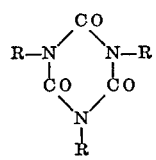

I wherein R represents a moiety having the formula

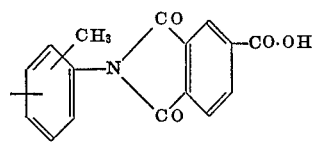

II

The process of the invention is characterized in that this tricarboxylic acid containing imide groups and one isocyanurate group is produced in the presence of the polyalcohol, and in some cases solvents, other polycarboxylic acids or their alkyl, e.g. lower alkyl, esters and/or pre-condensation products of e.g. polycarboxylic acid or polycarboxylic acid ester and polyhydric alcohol. The tricarboxylic acid-producing reaction is the reaction of trimerized toluylenediisocyanates masked by phenols, e.g. triphenylurethane of trimerized toluylenediisocyanate, and trimellitic acid anhydride.

British Patent 1,041,868 discloses a process for preparing tricarboxylic acids of the above formula by the reaction of trimerized toluylene diisocyanate with trimellitic acid anhydride in the presence of inert solvents such as hydrocarbons, halogenated hydrocarbons, ethers, N-substituted amides, sulfoxides, sulfones and mixtures thereof. The use of the intermediates obtained according to that patent for the manufacture of synthetic resins is also in the prior art. This being the state of the art, it was surprising to find that, instead of preparing the tricarboxylic acid first in a separate process, success can be achieved in synthesizing such resins, which are essentially ester resins, by adding the starting substances required for the synthesis of the tricarboxylic acid, i.e. trimellitic acid anhydride and the trimerized toluylene diisocyanates masked by phenols, to the rest of the reaction mixture which in some cases can be a preliminary condensation product of the rest of the reagents, and then carrying out continued condensation in the mixture thus prepared. This is because it could not be expected that the imide groups, and therefore the tricarboxylic acid (I) could form in the presence of alcoholic hydroxyl groups, or that a reaction of this kind could be quantitative. Because, while it is known that phenyl urethanes and cresyl urethanes dissociate at elevated temperatures to form the corresponding isocyanates and phenols, and the free isocyanates thus developed react with the trimellitic acid anhydride in the manner described above, without leading one to expect any particular disturbance of the equilibrium of the phenolic hydroxyl groups present, such a disturbance of the reaction in the presence of alcoholic hydroxyl groups certainly could be expected. The conditions of the reaction in the process of the invention are of the same kind as are usually present in the esterification of carboxylic acids. This being the situation, it was to be expected that a portion of the trimellitic acid would no longer be available for the desired reaction on account of the formation of partial esters of trimellitic acid, which would doubtlessly occur, and that, for one thing, reaction products would form which contain carboxylic amide groups and which are known to develop by the reaction of free carboxyl groups with isocyanates. Such a side-reaction would be highly undesirable, because resins of non-reproducible characteristics would be formed. It has been found, however, such side reactions are surprisingly absent.

Furthermore, the mere discovery that phenyl and cresyl urethanes, i.e. isocyanates masked by phenols, can be used in the process of the invention instead of free isocyanates was surprising in itself. This offers the additional advantage that, in the case of trimerized toluylene diisocyanate, recourse can be had to the regular commercial form of this product, for this special trimerized isocyanate is supplied almost exclusively as a "masked" product.

In addition to the tricarboxylic acid containing isocyanurate groups and imide groups that is to be produced in the reaction mixture according to the invention, simultaneous use can be made, for example, of the following dicarboxylic acids or the alkyl esters thereof: terephthalic acid, isophthalic acid, imide group-containing dicarboxylic acids of the formula

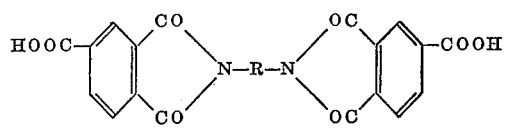

III wherein R represents an unsubstituted or alkyl, e.g. lower alkyl, substituted phenylene group or a group of the formula

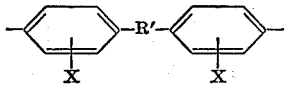     IV wherein the moiety R' represents a methylene group, a dimethylene group, or —O— or —SO$_2$—, and the moiety X represents a halogen atom or an alkyl moiety having 1 to 4 carbon atoms. The last-named carboxylic acids can, like the tricarboxylic acids of Formula I also be prepared in the presence of the hydroxyl group-containing (from polyalcohols) reaction mixture of trimellitic acid anhydride and diamines. Additional polycarboxylic acids suitable for the process of the invention are the phenylindane dicarboxylic acids, such as 1,1,3-trimethyl-5-carboxy-3-(p-carboxyphenyl)-indane, and the dicarboxylic acids containing pyrrolidone groups, which can be obtained from diamines and itaconic acid, and which have the general formula

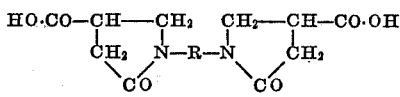     V wherein R has the meaning given above.

The polyalcohols for the process of the invention can be, e.g. ethylene glycol, cyclohexanedimethanol, 2,2-dimenthylpropanediol, glycerin, tris-hydroxyethylisocyanurate, pentaerithritol and other similar substances.

As in the preparation of such ester resins according to the state of the art described above, cresol can also be used as a solvent or added to the solvent that is being used in the process according to the invention. Although cresol must be regarded as a "non-inert" solvent according to processes of the prior art, its use causes no trouble whatever in the manufacture of these resins.

The manufacture of the resins containing isocyanurate groups and imide groups according to the invention is performed by adding to the polyalcohols and other polycarboxylic acids (if used) or products of the esterification or transesterification of the alcohols with polycarboxylic acids or alkyl esters of these polycarboxylic acids, a mixture of trimellitic acid anhydride and the trimerized toluylene diisocyanate "masked" with phenolic compounds, in a molar ratio of 3:1, and heating the reaction mixture, preferably at or near its boiling point, until the yielding of carbon dioxide has ended. Instead of the mixture of "masked" triisocyanate and trimellitic acid anhydride, these two components can be added in any desired sequence to the reaction mixture containing the polyalcohols. Furthermore, cresol can be added to the reaction mixture before or after the addition of the "masked" triisocyanate and the trimellitic acid anhydride, so as to serve mainly as a solvent. Lastly, esterification catalysts, such as p-toluenesulfonic acid, alkyl or aryl titanates, and the like, can be present without thereby producing any change in the course of the reaction.

That the reaction actually takes the course described has been proven by the fact that, after the yielding of carbon dioxide had ended, the reaction products showed no bands in the infrared spectrum corresponding to the —CO·NH bond, and that the further addition of trimellitic acid anhydride did not result in any additional yielding of carbon dioxide. From this it can be concluded that the anhydride groups and the urethane groups have reacted with one another in a virtually quantitative manner, with the formation of imide groups.

The resins manufactured according to the invention find use principally in the manufacture of wire insulating substances and varnishes.

The process represents a special technical advance due to the fact that, in the manufacture of these ester resins containing isocyanurate groups and imide groups, the separate preparation of the tricarboxylic acid containing these two groups can be dispensed with and it is possible to operate with a one-step process. Such a procedure, is of course, very economical.

The process according to the invention also offers the advantage that, in contrast to methods of the prior art by which resins containing isocyanurate groups are obtained, it leads to products which are thermally stable and whose characteristics can be made reproducible. For example, resins are known which contain imide groups and isocyanurate ring systems simultaneously, and which are prepared by the condensation copolymerization of trishydroxyethylisocyanurate, the dicarboxylic acids according to Formula III containing imide groups, and additional polyester-forming starting materials. The reproducible predetermination of the characteristics of such products for various applications is very difficult on account of the easy decomposability of the trishydroxyethylisocyanurate, which at first is still unesterified. Such difficulties, however, are not encountered in the resin manufacture according to the invention, which is not surprising in view of the excellent thermal stability of the unesterified imide tricarboxylic acid. It is also in the prior art to prepare pure ester resins by the use of trimerized toluylene diisocyanate or the product of its reaction with phenol or cresol. In this case the isocyanurate ring is incorporated into the polymer by means of urethane groups. The poor thermal stability of the urethane groups results in an often inadequate thermal stability in such resins. The resins prepared according to the invention have a much greater thermal stability in comparison.

The reaction conditions employed are those known in the art for the reactions involved. More particularly, the conditions can be as are known for production of polyesters, and polyesters containing imide groups.

EXAMPLE 1

57.6 g. of trimellitic acid anhydride, 84.9 g. of triphenylurethane of trimerized toluylenediisocyanate and 100 g. of ethylene glycol were stirred for 10 hours at 160° C. At first a strong development of $CO_2$ occurred, but soon subsided. After that the mixture was stirred for another 10 hours at 180° C., and no more yielding of carbon dioxide was perceptible. A clear, yellow resin was obtained which had an acid number of 3.8 mg. KOH per gram of resin. The infrared spectrum showed no

—CO·NH groups present. Another addition of 5 g. of trimellitic acid anhydride to 50 g. of the resin led to no further yielding of $CO_2$ at the boiling temperature of the glycol. The same results were obtained when the reaction was performed in the presence of 0.2 g. of p-toluenesulfonic acid in one case and 0.05 g. of butyl titanate in another.

When the same process described above was performed, using, instead of 100 g. of ethylene glycol, 150 grams of a mixture of 75 g. of ethylene glycol and 75 g. of glycerin, or 150 g. of cyclohexanedimethanol, or 150 g. of 2,2-dimethylpropanediol, a resin was produced in each case in which no —CO·NH bands were detected, and no resumption of $CO_2$ formation could be observed after the addition of more trimellitic acid anhydride with heating.

EXAMPLE 2

388 g. of dimethylterephthalate, 620 g. of ethylene glycol, 12.2 g. of glycerin and 1 g. of butyl titanate were stirred at 180 to 220° C. until the yielding of methanol had ended. 268 g. of the phenylurethane of trimerized toluylenediisocyanate was added to the hot transesterification product, plus a total of 192 g. of trimellitic acid anhydride in 5 portions. The product was stirred at 180° C. until the production of $CO_2$  has ended. Thereafter the temperautre was raised to 210° C. and excess glycol was removed by distillation under a low vacuum until the viscosity number of the resin amounted to 0.2.

The viscosity number (also called the "reduced viscosity") was determined on the basis of DIN 63,727 by means of a capillary viscosimeter at 25° C. The solvent was a mixture of 60% phenol and 40% 1,1,2,2-tetrachloroethane by weight. The applied concentration C of the solution amounted to 1 g. of resin per 100 ml. of solvent. The reduced viscosity $\eta_{red}$ was computed according to the formula $$\eta_{red} = \frac{\eta_{spec.}}{C} = \frac{\eta_{rel.} - 1}{C} = \frac{\frac{t}{t_0} - 1}{C}$$

wherein $\eta_{spec.}$ represents the specific viscosity, $\eta_{rel.}$ represents the relative viscosity, $t$ the length of time it takes the solution to run through, and $t_0$ the time it takes the solvent to run through.

35 parts by weight of the resin were dissolved in 42 parts by weight of cresol (isomeric mixture) and 13 parts by weight of xylene. To this solution was added 0.35 part by weight of a 50 wt.-percent solution of polymeric butyl titanate in cresol.

The varnish thus obtained was applied to copper wire of a diameter of 0.6 mm. by dipping the wire into it six times, baking it on after each dip by means of a wire varnishing machine operated at 450° C. and having an oven length of 2.5 m. At a wire speed of 11 m./min. a varnished wire was produced having a varnish coating 35 to 45μ thick, of a dark, golden brown color, whose surface was rated at 3H according to DIN 46,453 (October 1966). The wear resistance (DIN 46,543 (October 1966)) amounted to 45 double strokes; elasticity and thermal aging (50 h., 200° C.) were excellent; the impact strength when hot, of a coil of 0.6 mm. diameter, amounted to 260° C. for 15 minutes of thermal stress, and the compressive strength when hot, according to DIN 46,453 (October 1966, par. 5.2.2), was also determined to be 260° C.

If the procedure was such that the phenol-masked triisocyanate was added along with the trimellitic acid anhydride to the glycol-glycerin mixture, the mixture was heated at 180–190° C. until the formation of carbon dioxide ended, and finally the transesterification of the dimethyl terephthalate in this reaction product was performed, and this was followed by condensation polymerization as described above down to a viscosity number of 0.2, a varnish prepared from this resin and having the same composition as described above gave the same results as regards its application characteristics. Finally, the tricarboxylic acid containing imide groups was prepared separately in accordance with Example 10 of British Pat. 1,041,868; it was then esterified with the transesterification product of dimethylterephtalate and the above-described mixture of glycol and glycerin, and was polymerized also down to a viscosity number of 0.2. In this case, again, the application characteristics stated above were found in the product.

EXAMPLE 3

384 g. of trimellitic acid anhydride were added in the course of 2 hours to a mixture of 620 g. of ethylene glycol, 12.2 g. of glycerin and 100 g. of cresol at 180° C., and then, in the course of 5 hours, a total of 198 g. of 4,4'-diaminodiphenylmethane was added in small portions, the reaction water that orginated from the imide formation and the esterification being continuously removed by distillation. Then 2.0 g. of p-toluenesulfonic acid was added and stirring continued at 180–220° C. until the formation of water had ended, at which time the imide dicarboxylic acid was completely esterified. 268 g. of the phenyl urethane of trimerized toluylenediisocyanate was added, followed by another 192 g. of trimellitic acid anhydride, and the mixture was stirred at approximately 180–190° C. until the formation of $CO_2$ had ended. Then polymerization was performed at 210° C. in vacuo, while cresol and a portion of the glycol were distilled out, until the reddish brown resin had a viscosity number of 0.15.

EXAMPLE 4

A mixture of 600 g. of ethylene glycol, 15 g. of glycerin, 268 g. of phenylurethane of trimerized toluylene diisocyanate and 192 g. of trimellitic acid anhydride was heated at 180° C. in the presence of 0.2 g. of p-toluenesulfonic acid until the formation of $CO_2$ had ended. Then 238 g. of the dicarboxylic acid of the formula

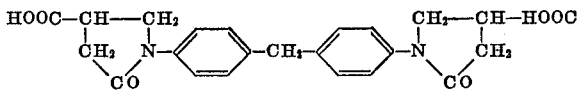

prepared from 2 moles of itaconic acid and 1 mole of 4,4'-diaminodiphenylmethane by stirring and final boiling in toluene, was added with 1 g. of butyl titanate and the esterification was performed at 180 to 190° C. until the formation of water had ended. Lastly, the product was polycondensed in vacuo down to a viscosity number of 0.22.

The resins of Examples 2–4 could, like the resin of Example 1, be dissolved to form varnishes. After these varnishes were baked onto thin copper sheet metal, hard, glossy coatings were obtained which did not crack nor spall off when the metal was creased.

EXAMPLE 5

97 g. of dimethyl terephthalate was stirred with 186 g. of ethylene glycol in the presence of 0.6 g. of butyl titanate at 180–195° C. until the formation of methanol had ended; then 268 g. of phenylurethane of trimerized toluene diisocyanate was added, plus a total of 192 g. of trimellitic acid anhydride in two portions. The temperature was kept at 195–200° C. until the yielding of $CO_2$ had ended. Then a mixture of 128 g. of trimellitic acid anhydride and 66 g. of 4,4'-diaminodiphenylmethane was added portion by portion so as to prevent the batch from bubbling over. Stirring was continued at 200° C. until an entirely homogeneous melt had formed, and then the temperature was raised to 215° C. and excess glycol was distilled off together with the phenol that formed, by the application of a low vaccum, until the resin had a viscosity number of 0.13.

35 parts of the resin were dissolved in 52 parts of cresol and 13 parts of xylene, 0.17 part of polymeric butyl titanate was added, and the varnish was baked onto 0.6 mm. copper wire as in Example 2. At wire speeds between 7 and 10 m./min., the surface hardness amounted to 6H to 7H, the resistance to abrasion was between 55 and 25 double strokes, elasticity and thermal aging were excellent, the hot shock resistance amounted to 270° C. and the hot compressive strength according to DIN 46,453, Par. 2.5.3 was 350–360° C.

Where the masked trimerized toluylene diisocyanates and trimellitic acid anhydride are reacted to form the acid (I) in the presence of precondensation product, e.g. as in Examples 2 and 5, the precondensate has terminal hydroxy groups, or at least two hydroxy groups and is thus a polyalcohol.

The precondensation product can be the product of esterifying dicarboxylic acid and polyalcohol (polyol) with the polyalcohol present in molar excess, e.g. 2–10 moles, preferably 5–10 moles of polyalcohol per mole of acid.

In Example 1, terephthalic acid or isophthalic acid can be present in the reaction medium in amount of, e.g. 1–2 moles per mole of acid (I). Similar results are then obtained.

In Example 4, the itaconic acid derivative can be replaced by a like molar amount of acid (III) wherein R is the moiety (IV), wherein R' is methylene and each X is chloro, the chloro groups being in the 2,2'-positions (R' being bonded to the 1,1'-positions), with similar results. Said acid (III) is produced in the reaction medium by reaction of trimellitic acid anhydride and the 4,4'-diamine of moiety (IV).

Also in Example 4, the itaconic derivative can be replaced by the same molar amount of the same acid having chloro groups at the 2,2'-positions of the diphenylmethane moiety, with similar results.

Also in Example 4, the itaconic acid derivative can be replaced by the same molar amount of 1,1,3-trimethyl-5-carboxy-3-(p-carboxyphenyl)-indan.

In place of phenol, for masking, other phenolic compounds, e.g. cresol, can be used.

What is claimed is:

1. Process of producing ester resin containing isocyanurate groups and imide groups in the polymer chain comprising heating:
   (1) polyalcohol,
   (2) triphenolic urethane trimerized toluene diisocyanate, and
   (3) trimellitic acid anhydride
at a temperature and for a time sufficient for formation of the resin.

2. Process according to claim 1 wherein said polyalcohol is a precondensation product of a polycarboxylic acid or polycarboxylic acid ester and a polyhydric alcohol.

3. Process according to claim 1, wherein terephthalic or isophthalic acid is present in said mixture.

4. Process according to claim 1, wherein there is present in said mixture an imide group-containing dicarboxylic acid of the formula

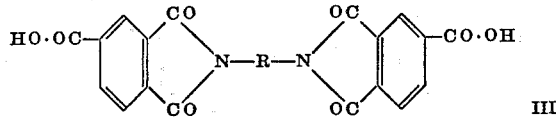

III wherein R represents an unsubstituted or alkyl-substituted phenylene group or a group of the formula

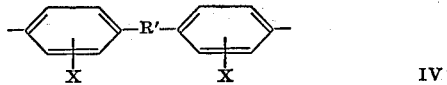

IV wherein R' represents a methylene group, a dimethylene group, —O— or —SO$_2$— and the moiety X represents a halogen atom.

5. Process according to claim 4, wherein said imide group-containing dicarboxylic acid is produced in said medium by reaction of trimellitic acid anhydride and diamine.

6. Process according to claim 1, characterized in that the reaction mixture contains an acid of the formula

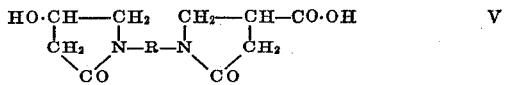

V wherein R represents an unsubstituted or alkyl-substituted phenylene group or a group of the formula

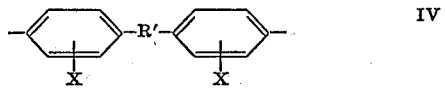

IV wherein R' represents a methylene group, a dimethylene group, —SO$_2$— or —O—, and the moiety X represents a halogen atom.

7. Process according to claim 1, wherein 1,1,3-trimethyl-5-carboxy-3-(p-carboxyphenyl)-indan is present in said medium.

8. Process according to claim 1, wherein at least one of the group dicarboxylic acids and dicarboxylic acid alkyl esters is present during said contacting.

9. Process according to claim 1, wherein the polyalcohol is a polyalcohol having 2 to 4 primary hydroxy groups.

10. Process according to claim 1, wherein the polyalcohol is ethylene glycol, cyclohexane dimethanol, 2,2-dimethyl propane diol, glycerin, trishydroxyethylisocyanurate, or pentaerithritol or a precondensation product of ethylene glycol, cyclohexane dimethanol, 2,2-dimethyl propane diol, glycerin, trishydroxyethylisocyanurate or pentaerithritol and a polycarboxylic acid or polycarboxylic acid ester.

References Cited

FOREIGN PATENTS 1,041,868  9/1966  Great Britain _____ 260—47 CB

WILLIAM H. SHORT, Primary Examiner

L. L. LEE, Assistant Examiner

U.S. Cl. X.R.

260—47 C, 75 N, 77.5 NC